Oct. 18, 1927.  
F. B. ROBERTS  
1,646,381  
STACKING AND CONVEYING MECHANISM  
Original Filed Oct. 11, 1923    6 Sheets-Sheet 1
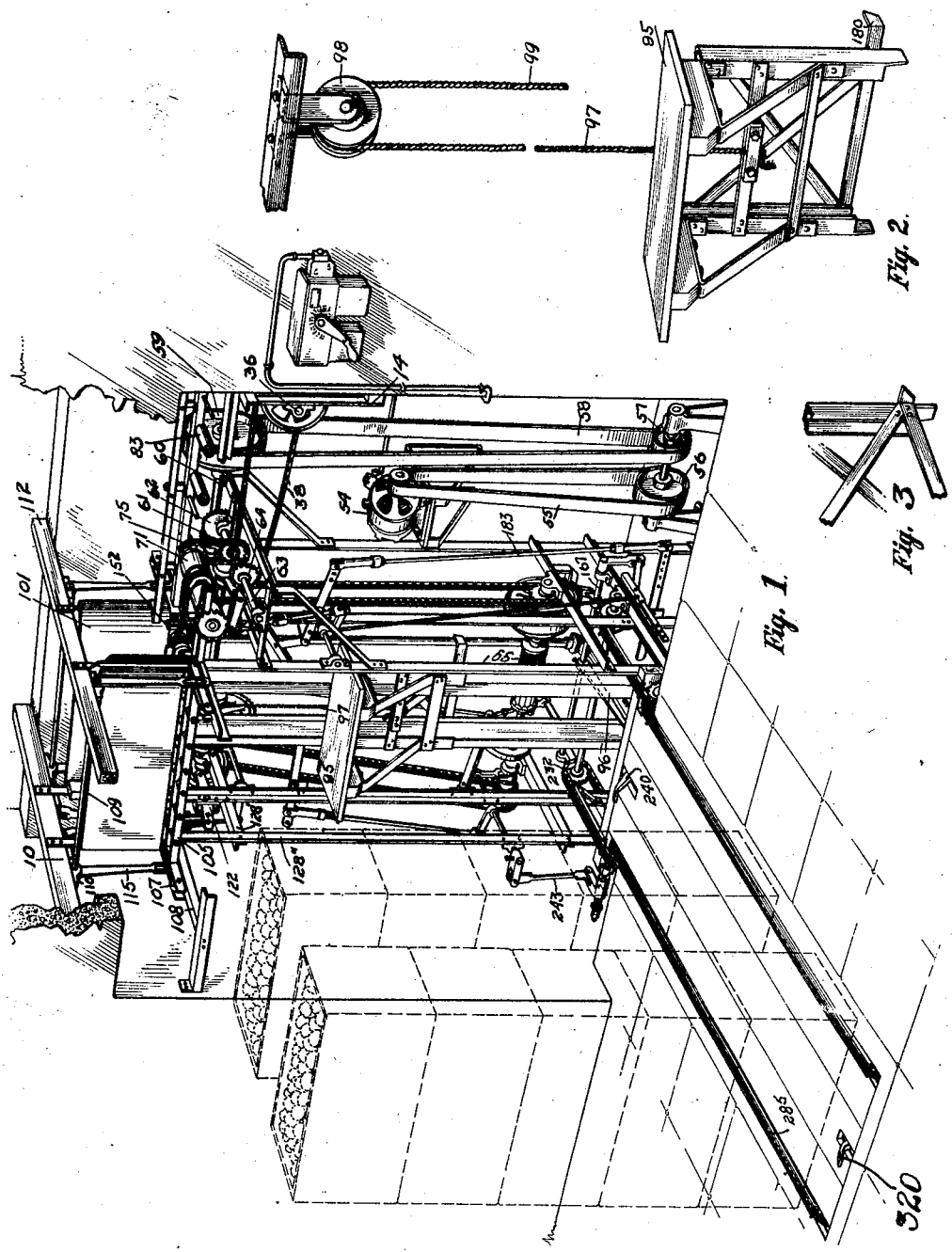
INVENTOR.  
FRANK B. ROBERTS.  
BY B. J. Craig  
ATTORNEY.

Oct. 18, 1927.
F. B. ROBERTS
1,646,381
STACKING AND CONVEYING MECHANISM
Original Filed Oct. 11, 1923    6 Sheets-Sheet 2
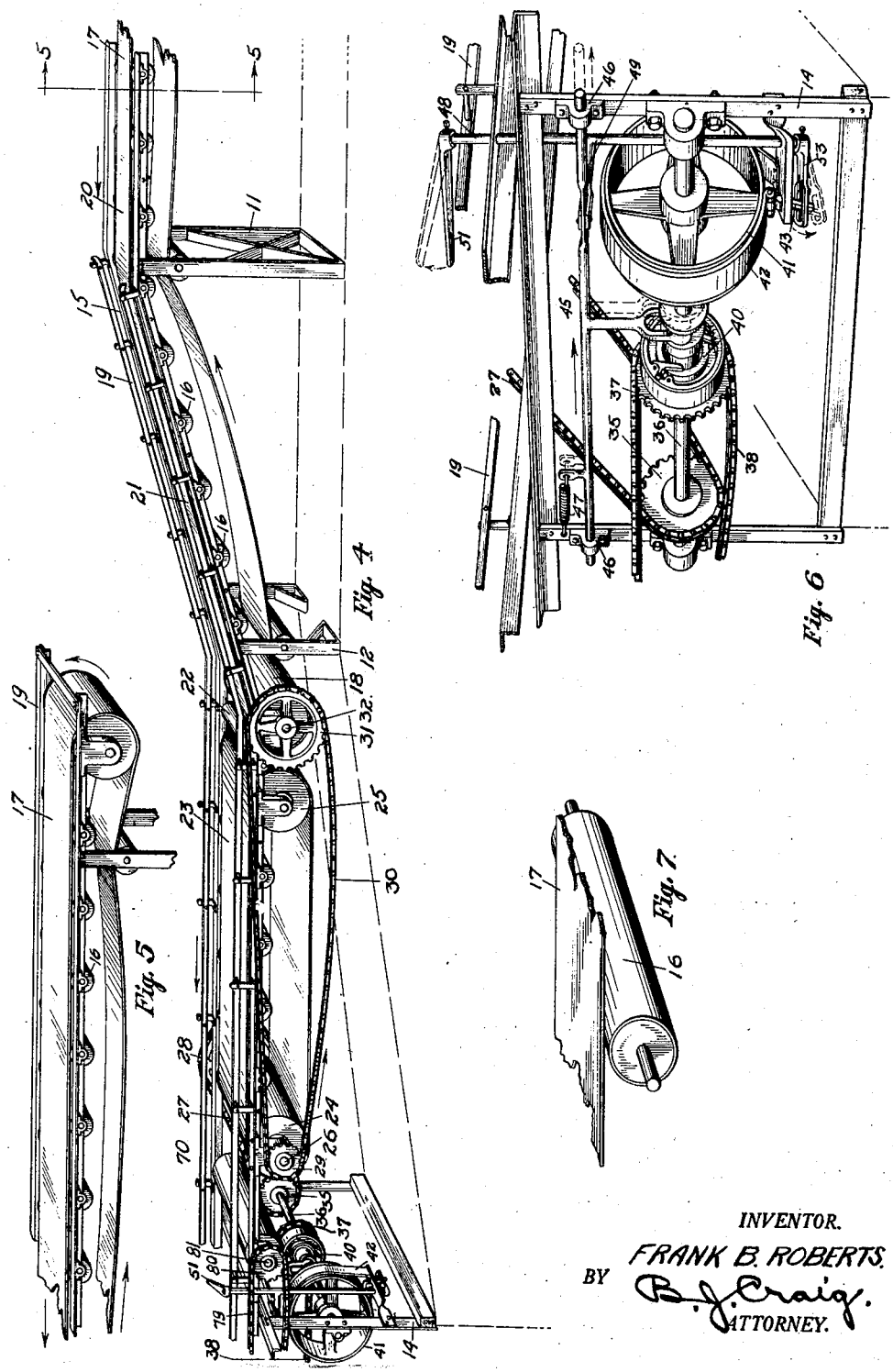
INVENTOR.
FRANK B. ROBERTS.
BY B. J. Craig.
ATTORNEY.

Oct. 18, 1927.　　　　　　　　　　　　　　　　　　1,646,381
F. B. ROBERTS
STACKING AND CONVEYING MECHANISM
Original Filed Oct. 11, 1923　　6 Sheets-Sheet 3
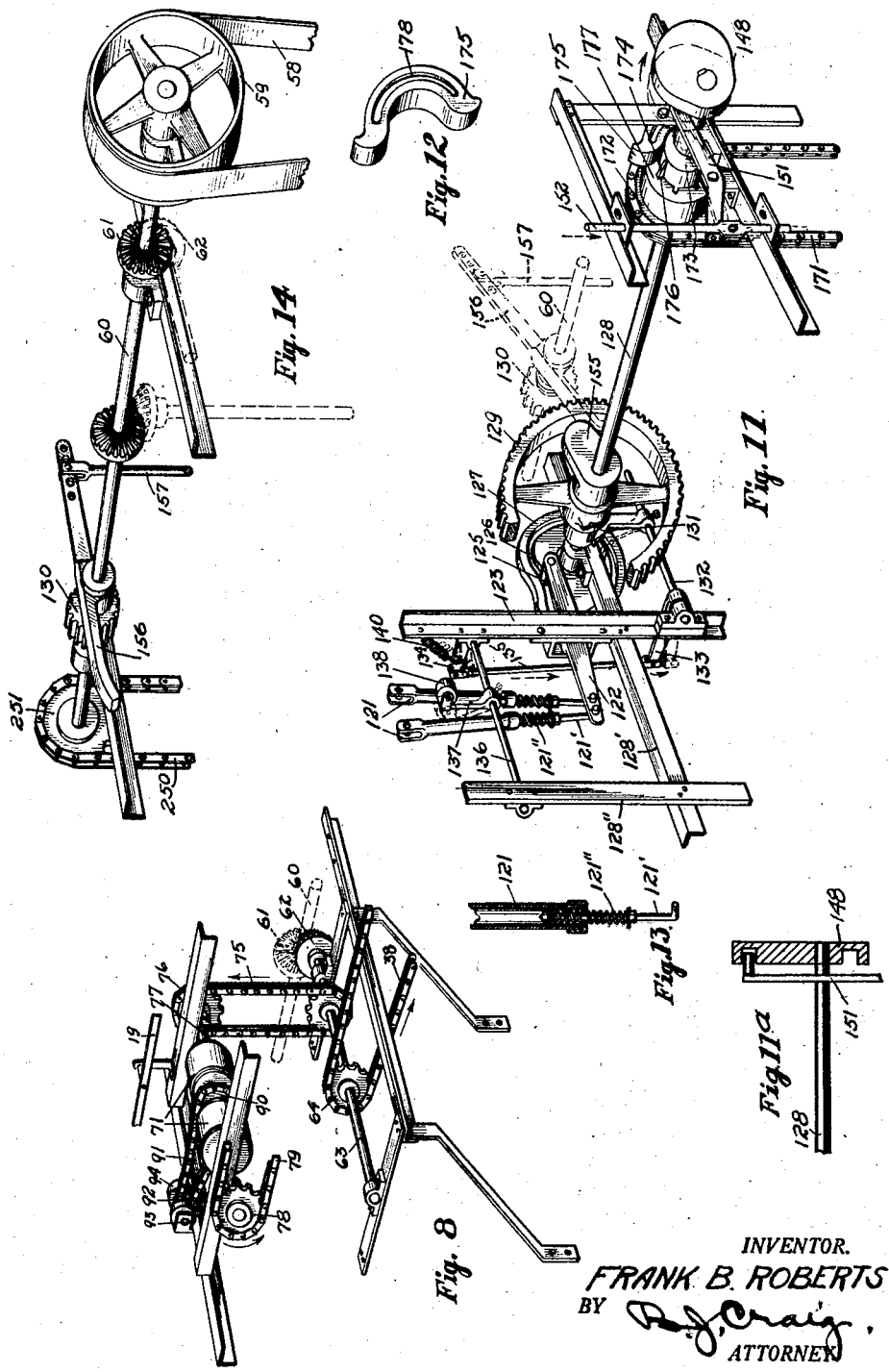
INVENTOR.
FRANK B. ROBERTS
BY
ATTORNEY Oct. 18, 1927.
F. B. ROBERTS
1,646,381
STACKING AND CONVEYING MECHANISM
Original Filed Oct. 11, 1923    6 Sheets-Sheet 4
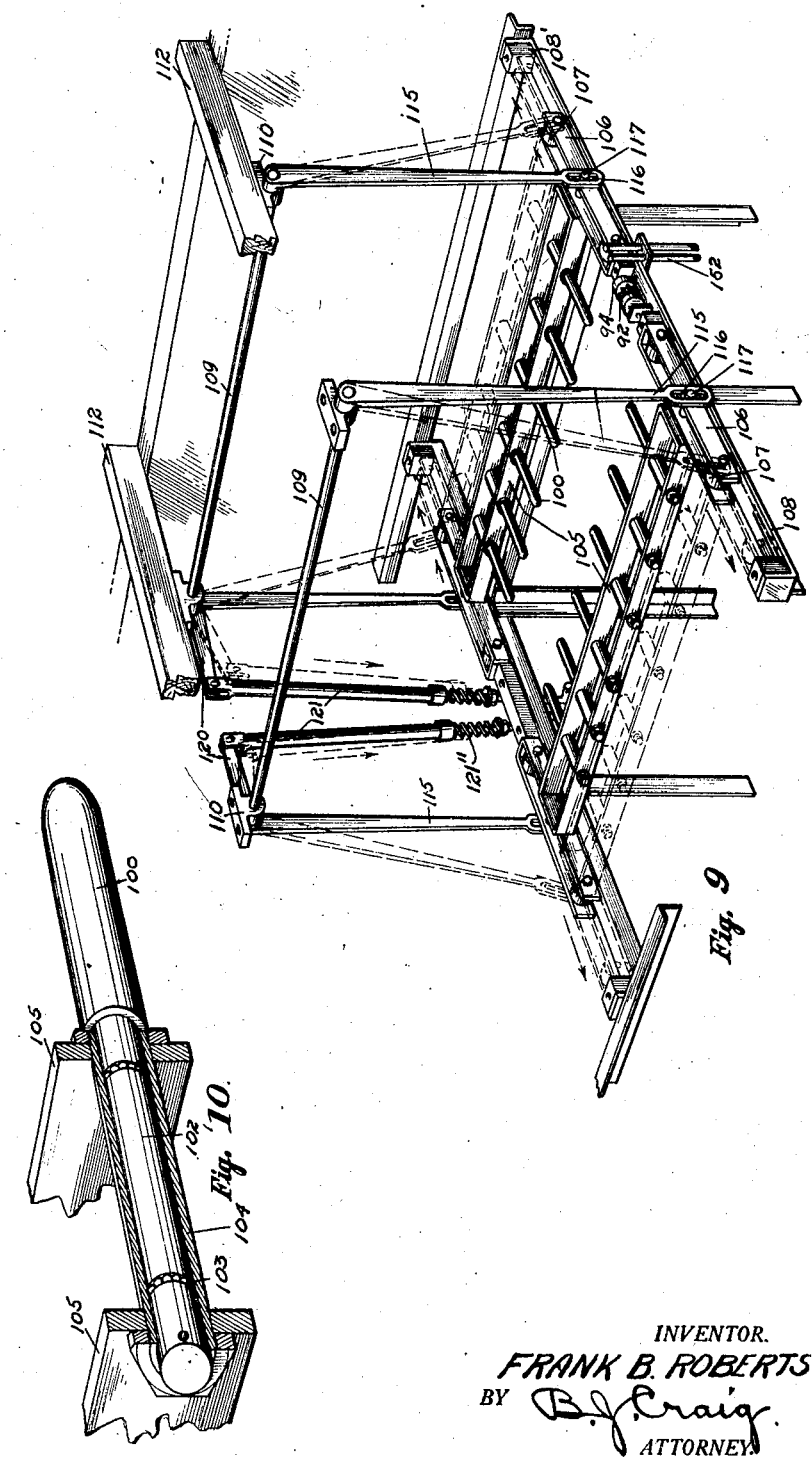
INVENTOR.
FRANK B. ROBERTS
BY B. J. Craig
ATTORNEY

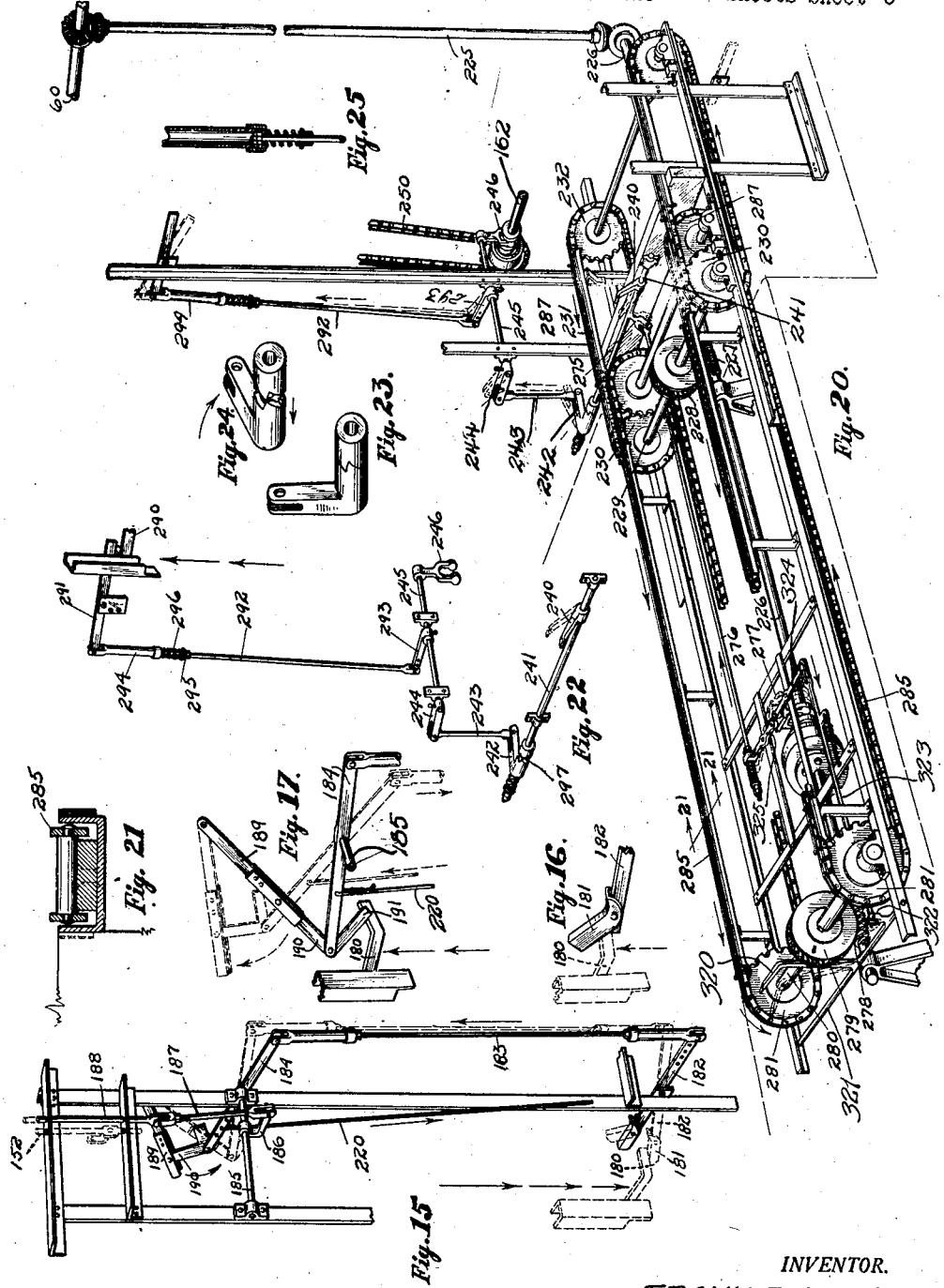

Oct. 18, 1927.
F. B. ROBERTS
1,646,381
STACKING AND CONVEYING MECHANISM
Original Filed Oct. 11, 1923    6 Sheets-Sheet 6
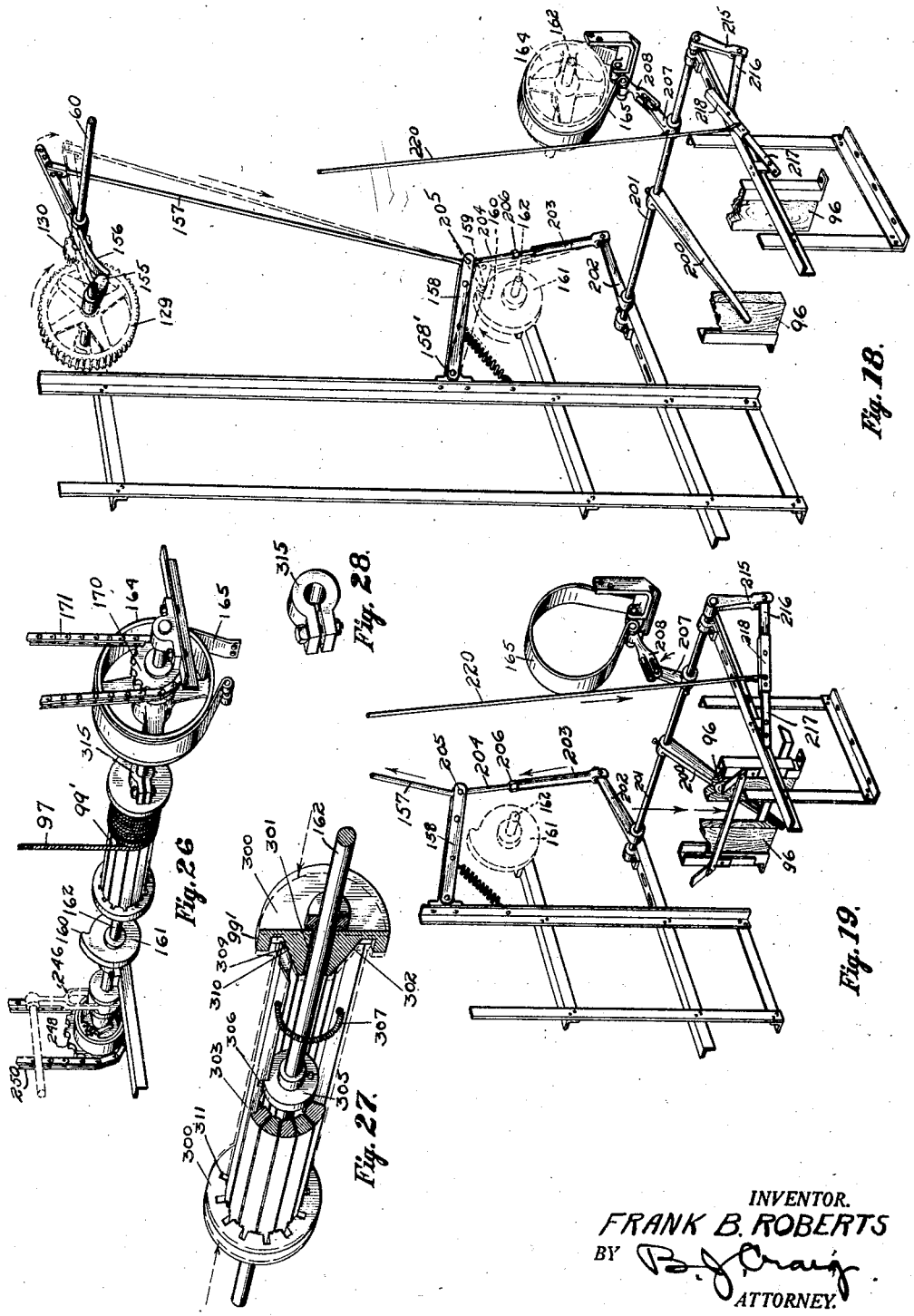
INVENTOR.
FRANK B. ROBERTS
BY B. J. Craig
ATTORNEY.

Patented Oct. 18, 1927.

1,646,381

UNITED STATES PATENT OFFICE.

FRANK B. ROBERTS, OF ANAHEIM, CALIFORNIA, ASSIGNOR OF ONE-HALF TO WILLIS G. HUNTINGTON, OF SAWTELLE, CALIFORNIA.

STACKING AND CONVEYING MECHANISM.

Application filed October 11, 1923, Serial No. 667,909. Renewed December 20, 1926.

This invention relates to means for transporting articles from one location to another.

The general object of the invention is to provide means for transporting articles from one station to another station located at a point remote from and at a different level from the first station and to stack the articles one upon the other while being so transported.

One of the specific objects of the invention is to provide means for transporting articles such as boxes horizontally, then moving the boxes vertically to another elevation and stacking them while they are moving vertically.

A further object of the invention is to provide means for transporting articles such as boxes horizontally, then moving them to another level while stacking them, and then moving them again horizontally.

Another object of the invention is to provide a mechanism for transporting articles singly in a horizontal direction, then moving them vertically and simultaneously stacking them one upon the other until a desired height is reached and moving the stack horizontally.

An additional object of the invention is to provide a mechanism for moving a plurality of articles laterally, then stacking them and simultaneously lowering the bottom of the stack and again transporting the articles laterally.

An additional object of the invention is to provide means for transporting a plurality of articles on an endless conveyor, delivering the articles from the conveyor to an elevating and stacking mechanism, changing the elevation of the stacked articles and moving the stacking articles horizontally when a desired number of the articles are in the stack.

A further object of the invention is to provide an elevator having means associated therewith for causing the elevator to descend step by step and which will cause the elevator to automatically ascend when the downward trip is completed.

A detailed object of the invention is to provide means for conveying boxes of fruit from a loading platform horizontally to an elevating mechanism, providing elevating means for receiving the articles singly one upon the other to form a stack and then moving the stacked articles horizontally and at right angles to the direction of movement of the articles upon the platform.

Other objects of the invention will be apparent from the following description taken in connection with the accompanying drawings wherein Fig. 1 is a perspective view of a mechanism embodying the features of my invention; Fig. 2 is a perspective view of an elevator adaptable for use with my invention; Fig. 3 is a detail of the elevator; Fig. 4 is a perspective view of the horizontal conveying means which extends from the right of that shown in Fig. 1; Fig. 5 is a perspective view of another portion of the conveying means being that part which is disposed at the right of the arrow 5—5 shown in Fig. 4; Fig. 6 is a perspective view of the means for controlling and driving the horizontal conveyor; Fig. 7 is a fragmentary perspective view of the belt and a roll; Fig. 8 is a perspective view of another part of the horizontal conveying mechainsm; Fig. 9 is a view of the mechanism for delivering the articles to the elevator; Fig. 10 is a section, partly in elevation, showing one of the delivery rolls; Fig. 11 is a perspective view showing the mechanism for controlling the delivery to the elevator; Fig. 11$^a$ is a sectional detail of a cam for operating one of the stop members; Fig. 12 is a perspective view of a portion of a clutch; Fig. 13 is a section in detail showing a portion of a pull rod; Fig. 14 is a perspective view of one of the drive shaft assemblies; Fig. 15 is a fragmentary perspective view showing the stop operating means for preventing delivery of articles while the elevator is ascending; Figs. 16 and 17 are fragmentary details showing parts of the stop operating mechanism; Fig. 18 is a perspective view showing the means for releasing the stop, and removing the brake so that the elevator may ascend; Fig. 19 is a view similar to Fig. 18 showing the parts in another position; Fig. 20 is a fragmentary perspective view showing the mechanism for removing the stacked articles from the elevator and transporting them; Fig. 21 is a section on line 21—21, Fig. 20; Fig. 22 is a perspective view showing the mechanism for causing the rewinding of the elevator cable; Figs. 23, 24 and 25 are views showing details of the rewind controlling mechanism; Fig. 26 is a perspective showing the assembly on the cable drum shaft; Fig. 27 is an elevation partly in section showing the cable drum and Fig. 28 is a perspective of a split nut adapted for use with the cable drum.

Referring to the drawings by reference characters, I have shown a mechanism embodying the features of my invention at 10. This mechanism as illustrated comprises means for conveying a plurality of articles longitudinally to a point where they are lowered and stacked one upon the other, after which the completed stack is moved horizontally. In order to facilitate the description of the machine, I will proceed to describe the operation of the horizontally conveying mechanism first, this will be followed by a description of the lowering and stacking mechanism after which a description of the means for moving the completed stack will be given, although I wish it to be understood that all of the parts cooperate to produce the single conveying act.

*Horizontal conveying mechanism.*

Referring to Fig. 4, I have shown the horizontal conveying mechanism as comprising a plurality of standards 11, 12 and 14. Mounted upon the standards 11 and 12, I show a frame work 15 which supports rollers 16. The rollers serve to support the belt conveyor 17 which may be operated by means of a drive wheel 18. Suitable rails 19 serve to prevent the articles being conveyed from moving laterally from the belt 17. It will be noted that the reach 20 of the belt is shown as substantially horizontally arranged while the reach 21, as indicated, is inclined downwardly, although other arrangements of the conveyor may be made as desired.

For simplicity of description I will refer to the articles being handled as boxes, but I wish it to be understood that the machine is adapted to handle many other articles.

The boxes passing down the reach 21 first pass over an idle roller 22 thence they pass to the reach 23 which comprises a belt supported on pulleys 24 and 25. The pulley 24 is shown as mounted on a shaft 26 which is driven by a chain 27 (Figs. 4 and 6), engaging a sprocket 28 mounted upon the shaft 26. At the end of the shaft 26 opposite the sprocket 28 I show a second sprocket 29 which has fitted thereon a chain 30, the latter engaging a sprocket 31 mounted upon the shaft 32 of the roll 18. The chain 27 passes over a sprocket 35 which is secured on a shaft 36. A second sprocket 37 is mounted on the shaft 36 and is in turn driven by means of a chain 38.

A clutch mechanism 40 (Fig. 6) is shown as mounted on the shaft 36. The shaft 36 is also provided with a pulley 41 fixed thereon and surrounded by a brake band 42 having an operating arm 43 thereon. The gear 37 is arranged to run loosely on the shaft 36 when the clutch 40 is out. The clutch 40 is controlled by means of an operating lever 45 shown as mounted to move laterally in brackets 46 mounted on the standard 14. The operating lever 45 is normally held in position with the clutch out by means of a spring 47. The lever 45 is connected to a vertical rod 48 by means of an arm 49. The rod 48 has an operating member 51 thereon. The rod 48 also has an arm 53 adjacent the lower portion thereof which arm has a slot therein adapted to receive the operating arm 43 for controlling the brake band 42.

The arrangement is such that movement of the operating lever to the dotted line position shown in Fig. 6 causes the clutch to disengage and thus stop the drive of the shaft 36 and at the same time the arm 53 causes the brake to be applied so that the conveying mechanism at once comes to rest.

In order to drive the conveying mechanism, I show a motor 54 (Fig. 1) which drives a belt 55 fitted over a pulley 56. Mounted coaxial with the pulley 56 I show a second pulley 57 having a belt 58 thereon which drives a pulley 59 mounted on a shaft 60 as shown in Figs. 1 and 14. The shaft 60 has a bevel gear 61 thereon which meshes with a second bevel gear 62 mounted upon a shaft 63, best shown in Fig. 8. The shaft 63 is provided with a sprocket 64 which drives the chain 38 previously mentioned and which passes over the gear 37. From the foregoing description, it will be apparent that the motor, when operating, drives the belts 55 and 58 to rotate the shaft 60, which in turn drives the shaft 63 which drives the shaft 36, which in turn by means of the chain 27 drives the chain 30, which drives the shaft 32 to thereby operate the belt conveyors 23 and 21.

Assuming that a box is on the reach 20 of the belt and that the motor is started; by means of the gearing previously described, the box will be conveyed until it strikes the arm 51, as shown in Fig. 6. The box will then advance moving the arm with it and as soon as the arm has reached the dotted line position shown in Fig. 6 the clutch 40 will be released and the brake band 42 tightened to quickly stop the conveying operation. As soon as the end of the box has passed the arm 51 and released the latter the conveying operation will again begin.

In order to convey the articles from the end reach of the belt 23 I show a roller 70 (Fig. 4) and a pair of spaced, driven rollers 71, Figs. 1 and 8. The rollers 71 are driven from the shaft 63, by means of the chain 75 which drives a gear 76 mounted on a shaft 77. The rollers 71 are mounted upon a shaft 77 so that they rotate therewith while the end of the shaft 77 carries a gear 78, which has a chain 79 thereon meshing with a gear 80 on the shaft 81 of the roller 70.

From the description previously given it will be apparent that the operation of the conveyors 17 and 23 is intermittent and that the conveyor rollers 70 and 71 rotate continuously to thus convey the box after the latter is delivered from the conveyor belt 23, and while the latter belt is at rest.

The guide rails 19 prevent the transported articles from moving laterally on the rolls 70 and 71. Idle rollers 83 may be provided to aid in supporting the articles being conveyed by the rollers 70 and 71. To advance the box from the rolls 71, I utilize a mechanism including the shaft 77 which is provided with a sprocket 90 which drives a chain 91. This chain drives a second sprocket 92, Fig. 8, mounted on a shaft 93 upon which are affixed a pair of rollers 94 which serve to drive the article being conveyed from the conveyor to the stacking mechanism now to be described.

*The stacking mechanism.*

The boxes are delivered from the rollers 94 onto a stacking mechanism. This stacking mechanism comprises an elevator 95 mounted to slide on vertical standards 96. The elevator is raised and lowered by means of a cable 97 which passes over a pulley 98 mounted on the frame of the machine. The end 99 of the cable extends to a winding drum 99' which is operated in a manner to be presently described.

In operating my machine as soon as a box is delivered to the elevator, the elevator is lowered so that a second box can be placed on the top of the first one. This is repeated until the stack is complete. The operation is carried out by the following mechanism.

After each article or box has been advanced by the rollers 71 its movement is continued by the rollers 94 which direct it onto rollers 100, as shown in Fig. 9 (Fig. 1). Guideways 101 at the top of the machine are provided to prevent lateral displacement of the box while being conveyed. Each of the rollers 100 (see Fig. 10) preferably comprises a cylindrical member having a shaft 102 thereon which my be mounted on antifriction members 103 which are secured in a sleeve 104. The ends of the rollers 100 are preferably semi-spherical in shape so that the boxes will readily pass thereover. The sleeves 104 are shown as mounted in cross members 105. These cross members preferably comprise pairs of bars which are provided with end portions 106 to which they are secured. The end portions 106 have rollers 107 thereon engaging a track member 108 rigidly supported on the machine. Resilient bumpers 108' may be provided at the ends of the track 108.

From the description it will be apparent that the cross members 105 may be moved on the rollers 107 laterally away from each other so that a box held in the rollers may be dropped. To provide for this movement, I show a pair of shafts 109 which are mounted to rotate in brackets 110 supported on the cross bars 112. The brackets are provided with arms 115, the lower portions of which are slotted as at 116 to receive pins 117 mounted rigidly on the end members 106.

Each of the shafts 109 is provided with a link 120 fixed thereon. The links 120 are connected with pull rods 121. The pull rods 121 are each connected by means of hooked rods 121' with an arm 122 (see Fig. 11) shown as pivotally mounted intermediate its length on a standard 123. A resilient connection is preferably provided between the pull rods 121 and the hooked rods 121' so that if for any reason a box does not fall between the rolls 100 when they are separated, the rocking action of the arms 115 tending to bring the cross members 105 and rolls together will not break any working parts but will merely compress the springs 121'' until such time as the box is removed.

From the preceding description it will be apparent that when the arm 122 is rocked the pull rods will move downward thereby rocking the arms 120 and causing the arms 115 to move outwardly and carry the frames 105 apart so that the box resting on the rollers 100 will be dropped.

To operate the arm 122 I provide a wrist pin 125 (Fig. 11) at one end thereof which is adapted to fit within a cam groove 126 on a cam member 127. The cam member 127 is keyed upon a shaft 128 supported on a cross member 128' which is arranged on the standard 128''. This shaft 128 is driven from the shaft 60 by means of the gears 129 and 130 which rotate continuously. The shaft 128 is arranged to be connected with the gear 129 by means of a single rotation clutch 131. To effect the clutching operation I show the clutch as connected with a shaft 132 which is adapted to be rocked by the arm 133 which is in turn connected with an arm 134 by means of a rod 135. The arm 134 is fixed on a shaft 136 which is provided with an actuating member 137 having a roller 138 mounted upon its upper end. A spring 140 serves to normally hold the roller in the full-line position shown in Fig. 11.

The actuating member 137 is mounted above the rollers 100 and just beyond the last of these rollers so that when a box is delivered to these rollers it passes over them and strikes the actuating member 137. The actuating member 137 acts through the connecting links and causes the clutch 131 to connect the cam 127 with the shaft 128 thus causing the arm 122 to be pulled downwardly thus pulling downwardly the arms 121 and causing the links 115 to move outwardly and thereby pull apart the rollers 100 thus letting the article held up by these rollers, fall between them.

At the same time that the cam 127 is causing the roller members 105 to move laterally, the shaft 128 rotates the cam 148 (see Fig. 11) which is fixed thereon thereby rocking the arm 151 and raising the stop pin 152 which is pivoted to the arm 151, to prevent the delivery of a box to the rollers 100 while the latter are spaced apart.

The shaft 128 is provided with a cam projection 155 which is adapted to engage a pivoted arm 156, Figs. 11, 14, and 18, which is connected by means of a rod 157 with a link 158. The link 158 comprises a pair of spaced members which are pivoted to the frame at 158' and which are provided with a stop member 159 arranged between the spaced members, which in one position engages a stop portion 160 on a disc 161. The disc 161 is mounted on a shaft 162 which has the sheave 99' fixed thereon. A brake member 164 including a brake band 165 is also mounted on the shaft 162. It will be obvious that when the stop members 159 and 160 are in engagement that the drum 99' cannot unwind.

The cable drum 99' is mounted on the shaft 162 and on this shaft I show a gear 170 (Fig. 26) which is adapted to be driven by a chain 171 which in turn engages a gear 172 mounted on the shaft 128. The sprocket 170 is fixed on the shaft 162 (Fig. 26) while the sprocket 172 (Fig. 11) is normally stationary and is adapted to be clutched to the shaft 128 by means of the clutch 173.

The clutch 173 is of such a character that the shaft 128 turns idly without rotating the sprocket 172 during part of a rotation or as long as a key 174 engages a dog 175. When the shaft has turned the key 174 which is fixed upon it until the key is free from the dog 175 the key is pressed outwardly by a spring arranged beneath it and enters a notch 176 in the clutch member 177 which is fixed to the sprocket 172 and consequently rotates this sprocket until the dog is again engaged by the key and the latter is depressed. As shown in Fig. 11 the key is in the slot 176 so that the sprocket 172 is clutched to the shaft 128. The slot 178 in the dog 175 allows the latter to be adjusted to time the clutching operation. The relation of the clutch 173 to the sprocket 172 and to the parts mounted on the shaft 128 is such that the shaft 128 may turn idly without rotating the sprocket 172 until the time when the cam 155 has rocked the lever 156 and thus released the stop 159. As soon as the stop is thus released the clutch 173 causes the sprocket 172 to be driven by the shaft 128 thus driving through the chain 171 and sprocket 170, the shaft 162 and the drum 99' on the shaft 162 so that the cable 97 on the drum is unwound.

The clutch 131 previously described is of the single rotation type, that is, when the clutch is thrown in it remains in until one complete revolution of the shaft 128 is made. Clutches of this character are well known in the art and the resultant action of the mechanism described which is illustrated in Fig. 11 is such that when a box strikes the roller 138 through the movement of the shaft 136 the arm 134, the link 135, the arm 133, the shaft 132, and the clutch member 131, the cam 126 will rock the arm 122, thereby separating the rollers 100 to release a box held thereon, rotating the cam 148 to raise the stop 152, tripping the lever 156 to raise the stop 159 and rotating the gear 172 to cause the cable to be unwound from the drum and lower the elevator a distance equal to substantially the height of a box being handled.

The number of boxes adapted to be placed in each stack by my invention may vary to suit the conditions. The arrangement shown is such that after the fifth box has been delivered to the elevator, the latter moves down between a pair of spaced conveyor chains, to be presently described. The boxes have a length greater than the length of the elevator platform 95 and consequently each end of the lowermost box projects beyond the elevator. As the elevator passes between the spaced chains the ends of the lower box engage the chains and as the elevator continues its lowering movement the stack of boxes is deposited on the chains.

It is necessary to provide means for preventing feeding of additional boxes to the elevator until the latter has ascended to its top position and to do this, I provide a projection 180 (see Figs. 15 and 16) on the lower part of the elevator which when the elevator has reached its lowermost position engages the end 181 of a pivoted arm 182 and rocks this arm.

The arm 182 is connected by means of a link 183 with an arm 184. The arm 184 is fixed to rotate with a shaft 185 secured to the stationary uprights supporting the elevator. The shaft has a bell crank lever 186 secured thereto. The bell crank 186 has a link 187 secured thereto which operates a stop arm 188. Following through the last described mechanism when the projection 180 on the elevator strikes the arm 181 the system of links and levers raises the stop 188 to prevent feeding of boxes to the rollers 100. It is necessary to provide this stop 188 in addition to the stop 152 for the reason that the stop 152 is operated intermittently, only when the rollers 100 are separated for discharge. The stop 188 is raised and is lowered by the elevator independently of the position of the rollers 100.

In order to hold the stop 188 in raised position while the cable 97 is being wound up and while the elevator is ascending to its loading position, I show a link mechanism comprising a pair of pivoted arms 189 and 190, best shown in Figs. 15 and 17. The arm 189 is fixed to an upright to pivot thereon and the arm 190 is pivoted to the arm 184. The relation of the arms 189 and 190 is such that when the two are straightened, as shown in full lines in Fig. 17, rocking movement of the arm 184 is prevented. The arm 190 is provided with an angular projection 191 which when the arms are straight assumes a position shown in Fig. 17. From the foregoing description it will be apparent that when the parts are in the position shown in dotted lines in Fig. 15 and in solid lines in Fig. 17 that the stop 188 will remain raised.

After the elevator reaches the lowermost position its direction is reversed by means presently to be described, and it is raised. The projection 180 then strikes the pivoted end 181 on the arm 182 and sweeps beyond this arm and moves upwardly until it strikes the angular extension 191 rigid with the arm 190. This action breaks the straight arrangement of the links 189 and 190 and causes the stop arm 188 to be lowered.

When the elevator reaches its lowermost position, it is necessary to provide means for releasing the stop 159 and the brake 165 so that the cable 97 may be rewound. To do this the elevator is arranged to strike an arm 200 (Figs. 18 and 19) rocking this arm and its shaft 201 and likewise rocking the arm 202. The arm 202 pushes upwardly on the tubular arm 203 which slidably receives the link 204 pivotally mounted at 205 on the stop member 158. A stop 206 on the link 204 is engaged during this movement by the end of the tubular arm 203 and this engagement causes the locking stop 158 to be raised so that the act of rocking the arm 200 raises the stop 158.

The shaft 201 is provided with an arm 207 which cooperates with an operating member 208, controlling the brake band 165, which controls the pulley 164 on the shaft 162.

From the foregoing description it is obvious that at the same time the arm 200 is rocked to raise the stop arm 158, the operating member 208 of the brake band 165 is moved to release the brake so that the cable may be wound on the drum 99' mounted on the shaft 162. It is necessary to maintain the stop 159 released and the brake 165 off as described while the elevator is ascending. To bring this about, I provide an arm 215 mounted on the shaft 201. The arm 215 is connected by means of a link 216 with an arm 217. The arm 217 has a projection 218 thereon which, as shown in Fig. 19, engages the link 216 to hold them in a straight relation. The arm 217 is connected by means of a link 220 with the arm 184 on the stop operating mechanism.

From the preceding description it will be apparent that when the stop member 159 has been raised and the brake taken off that these parts will remain in this postion until the stop 180 on the ascending elevator strikes the projection 191 and breaks the straight relation of the links 189 and 190 thereby allowing the lever 184 to be rocked thus pulling up on the link 220 and breaking the straight relation of the links 216 and 217.

*The delivery mechanism.*

The delivery mechanism for conveying the stacked articles from the elevator runs continuously and as soon as the elevator lowers and deposits a stack of boxes on this delivery mechanism, the stack is automatically conveyed away. The delivery mechanism, best shown in Fig. 20, is driven from the shaft 225 which is in turn driven by the shaft 60. The shaft 225 drives the shaft 226 and this shaft is provided with a worm 227 which drives a worm wheel 228 mounted on a shaft 229. The shaft 229 has gears 230 at each end thereof which drive the chains 231 constituting the delivery conveyor. The chains 231 pass over other gears 232.

The elevator in its lowest position passes between and below the chains 231 thus depositing the tier of boxes on the chains. The elevator remains in its lowest position while the delivery chains operate and as the stack of boxes moves along, the front portion of the lowest box of the stack strikes the arm 240, which is fixed on a shaft 241. This rotates this shaft and rocks the arm 242 (Figs. 20 and 22) which through the link 243 rocks the arm 244 on the shaft 245 and causes the clutch member 246 (Figs. 20 and 26) to operate, thus clutching the shaft 162 to the gear 248 which through the chain 250 is driven by the gear 251 (Fig. 14) on the shaft 60. This operation causes the drum 99' on the shaft 162 to be rotated in the winding up direction so that the elevator is raised.

It will be noted that in winding up the drum the latter is driven from the shaft 60 through sprocket 251, chain 250, and sprocket 248, the operation being controlled by the clutch 246, while the unwinding of the drum (the power of the motor must be used in unwinding the drum since the brake 165 is on while the elevator is being lowered) is through shaft 60, sprocket 130, sprocket 129, shaft 128, sprocket 172, chain 171, and sprocket 170 to shaft 162, the operation being controlled by clutches 131 and 173 so that the reverse direction for winding and unwinding is obtained from the shaft 60.

When the shaft 241 is rocked by the arm 240 the arm 275 (Fig. 20) is rocked pulling the rod 276 and throwing in the clutch 277. This clutch is mounted on the drive shaft 226 and serves to connect this shaft with a worm 278 so that the latter drives the worm wheel 279 mounted on the shaft 280 having a sprocket 281 on each end thereof. Chains 285 engage the sprocket 281 and also engage sprockets 287 mounted adjacent the sprockets 230. The clutch 277 is of the friction type so that when the arm 240 throws in the clutch 277 the stack of articles on the chains 285 begins to move as the next stack leaves the chains 231, to provide a continuous stack of boxes.

After the boxes have been delivered and when the elevator ascends a projection 290 thereon engages a pivoted arm 291 mounted on a vertical standard, which arm is connected by a link 292 and an arm 293 with the shaft 245. The shaft 241 is provided with a spring tensioned slip joint 297 at one end so that if the elevator reaches its complete top position where the arm 290 strikes the arm 291 before the arm 240 is cleared by the boxes, the slip joint 297 will operate and the arm 240 will remain depressed until cleared by the boxes. A spring pressed sliding joint 294 may be provided on the link 292 to take up the shock present during operation.

The distance the elevator is lowered during each step by step operation is dependent upon the circumference of the cable drum 99′. In stacking boxes of different heights it is desirable that the amount the elevator is lowered at each step should be adjustable. To provide for this adjustability, I construct the cable drum 99′ in such a manner that the diameter thereof may be readily altered. Referring to Fig. 27 I show the cable drum as comprising a pair of end members 300 having an axial bore 301 therethrough and having a conical inwardly projecting portion 302 on the inner surface of the end members 300.

The drum proper comprises a plurality of longitudinally extending strips or cleats 303. Each of the cleats is preferably tapered so that the contiguous edges thereof will be in parallel relation. The ends of the strips 303 are tapered as at 304 to fit upon the tapered portions on the projections 302. A collar 305 is preferably arranged on the shaft 162 and this collar is arranged to fit in a notch 306 cut in each of the strips 303. A spring 307 or other fastening member may be passed through apertures in the strips 303 to prevent their disalignment during assembly. The strips 303 are shown as provided with narrow end portions 310 which are adapted to engage in slots 311 and end members 300.

To adjust the cable drum the split nut 315 shown in Figs. 26 and 28 is released, and the two end members of the cable drum are moved toward each other if the diameter of the drum is to be increased, and separated if the diameter is to be diminished, after which the nut 315 may be clamped.

Having thus described the various parts and their relation to one another I will now proceed to describe the operation of the machine as a whole. Assuming that the boxes have been placed upon the reach 20 of the conveyor belt and that the motor 54 is operating, the boxes will be conveyed down the reach 21 of the belt to the reach 23 whence they will pass over the rollers 70 to the rollers 71 and thence to the delivery rollers 94.

As each box strikes the arm 51 the conveyor reaches 20, 21 and 23 stop their movement. The forward box is delivered from the rollers 94 to the rollers 100 on the discharging mechanism. The advancing box strikes the operating roller 138 and rocks the shaft 136 thereby throwing in the clutch 131 and causing the rollers 100 to separate and to discharge the box held thereon upon the elevator. Shortly after this occurs the cam 155 rocks the arm 156 to remove the stop member 158 and this operation is followed by the throwing in of the clutch 173 which at once causes the elevator to be lowered a definite distance depending upon the circumference of the cable drum 99′. During this operation the stop member 152 is raised by the cam 148 thus preventing the accidental delivery of another box to the rollers 100 while they are separated. The continued rotation of the shaft 128 causes the various parts described to assume their normal position and to cause another box to be delivered to the rollers 100. This operation is repeated step by step until the desired number of boxes have been stacked.

In the drawings the number of boxes indicated at dotted lines in Fig. 1 is five, although more or less may be stacked, depending on the length of the elevator runway.

When five boxes have been deposited on the elevator the latter moves between the conveyor chains 231 and deposits the boxes upon these chains. The chains 231 are continuously driven from the shaft 225 and as soon as the stack of boxes is deposited on these chains the stack begins to move to the left in Fig. 20.

The continued downward movement of the elevator causes the projection 180 on the elevator to rock the arm 182 thereby raising the stop 188. The downwardly moving elevator also strikes the arm 200 rocking the shaft 201 thereby removing the stop member 158 from operation and releasing the brake band 165 so that the cable drum 99′ is free to be rewound.

The boxes being transported on the chains 231, the lower edge of the front box strikes the arm 240 turning the shaft 241 and throwing in the clutch 246 to cause the cable drum to wind up the cable. This causes the elevator to ascend until the projection 290 thereon strikes the pivoted arm 291 thereby throwing out the clutch 246.

The projection 180 on the ascending elevator strikes the arm 191 thereby moving the links 189, 190, and withdrawing the stop 188 from operative position and operating the link 220 to cause the stop 158 and the brake band 165 to assume the normal position.

The stack of boxes continues its movement to the left in Fig. 20 finally releasing the arm 240. The delivery of the articles on the chain 231 is then taken up by the chains 285 and the boxes moved to provide a continuous row of stacks.

If desired, I may provide an arm 320 shown in Fig. 20, which will be engaged by the lowermost box in the stack when the stack reaches the end of the conveyor chains 285. The arm 320 is mounted on a shaft 321 having a crank 322 thereon connected by a link 323 with a system of levers 324, 325 which are in turn connected with the link 276. When the arm 320 is depressed the link 276 is moved to the left in Fig. 20 thereby rocking the shaft 241 so that this delivery of boxes will be stopped.

Having thus described my invention, I claim:

1. In a transportation device, an elevator including a reciprocating platform, means to intermittently deliver boxes to the elevator platform, means to lower the elevator platform after the boxes are placed thereon and means for thereafter moving said stacked boxes, the bottom of said boxes remaining horizontal throughout their movement.

2. In a box stacking machine, an elevator, a box delivery mechanism for delivering boxes to the elevator, means to lower said elevator, and means actuated by the positioning of a box on said delivery mechanism for causing actuation of the elevator lowering means.

3. In a stacking mechanism, an elevator including a movable platform, means to place boxes on said platform, means to lower said platform step by step until a predetermined number of boxes have been placed thereon, a conveyor adjacent to the bottom of said elevator and means whereby said conveyor will move a completed stack of boxes from the platform, and a single source of power for operating said elevator and conveyor.

4. In a box handling machine, a normally stationary elevator, means to deliver a box to the elevator while it is stationary, means to lower the elevator after a box is placed thereon, means to stop the elevator after it has been lowered and to actuate the box delivering means to cause a second box to be placed upon the first box, means to repeat this operation until a predetermined number of boxes have been stacked, a conveyor beneath said elevator, means to deliver a stack of boxes to the conveyor, and means to actuate the conveyor.

5. In a transportation device, a normally stationary elevator, means to convey a plurality of boxes to the elevator and deliver them one at a time, means to move said elevator as each box is delivered a distance equal to the thickness of the box whereby the boxes may be stacked and means for discharging the stack from the elevator, the bottom of said boxes remaining horizontal throughout their movement.

6. In an article handling machine, a conveyor, an elevator, means for discharging articles from the conveyor to the elevator, means whereby after each article is discharged to the elevator the delivery of articles is temporarily automatically stopped, and the elevator is lowered a predetermined distance, means whereby when said elevator has been lowered another article is delivered thereto and means for discharging the stack of articles from the elevator.

7. In a box handling mechanism means to convey a plurality of boxes horizontally, an elevator having a floor normally arranged at a height substantially level with the delivery end of the conveyor, means for delivering boxes from the conveyor to the elevator and additional means for lowering the floor a distance equal to the height of each box after each box is delivered thereto, said lowering operation being continued until a predetermined number of boxes are stacked and means for moving said stack of boxes when formed.

8. In an article handling machine, a conveyor, an elevator, means adjacent one end of the conveyor for discharging articles therefrom onto the elevator, means whereby after each article is discharged to the elevator the delivery of articles is automatically stopped, and the elevator is lowered a predetermined distance, means whereby when said elevator is in said lowered position another article is delivered thereto and additional means for stopping the delivery of articles to the elevator when a certain number have been delivered thereto and for discharging the stack of articles from the elevator.

9. In an elevator, a supporting frame, a platform movable thereon, a pair of gates arranged above said platform, and means to separate said gates to deliver a box held on said gates to said platform, means to move said boxes to said gates and means operable by a box which is positioned upon said gates to intermittently stop said feeding means and to separate said gates.

10. In an elevator, a supporting frame, a platform movable thereon, a pair of movable gates arranged above said platform, means to move said gates apart and to deposit a box held on said gates upon said platform, means to stop said feeding means and to separate said gates and means to lower said platform step by step.

11. In a box stacking machine, an elevator, means to deliver boxes to the elevator, means to lower and raise said elevator, means actuated by the positioning of a box on the box delivery mechanism for actuating the elevator lowering means and other means actuated by the elevator when in its lowermost position for actuating the elevator raising mechanism.

12. In a conveying mechanism, a conveyor, a cable drum, an elevator, a cable connecting said elevator to the drum, means to lower said elevator step by step by unwinding said cable, a shaft on which the cable drum is mounted, a stop on said shaft for holding said elevator at each step, a brake on said shaft, and means operable when said elevator is at the bottom of the shaft for disengaging said stop member and releasing said brake so that the elevator may ascend.

13. In a conveyor mechanism, a horizontal conveyor, an elevator, means to deliver articles from the conveyor to the elevator, means to lower said elevator step by step, a stop for holding said elevator at each step, a brake coacting with said stop and means operable when said elevator is at the bottom of the shaft for disengaging said stop member and releasing said brake so that the elevator may ascend.

14. In a conveying mechanism, a conveyor, a cable drum, an elevator, a cable connecting said elevator to the drum, means to lower said elevator step by step by unwinding said drum, a shaft on which the cable drum is mounted, a stop on said shaft for holding said elevator at each step, a brake on said shaft, a second stop controlled by said shaft to prevent delivery of articles from said conveyor and means operable when said elevator is at the bottom of the shaft for releasing said stop member and removing said brake so that the elevator may ascend.

15. In a conveyor mechanism, a conveyor, an elevator, means to lower said elevator step by step until a predetermined number of steps have been taken, means for holding said elevator after each step, means for raising said elevator, and automatic means operated by the elevator for releasing the holding means while the elevator is being raised.

16. In a conveying mechanism, an elevator, means for delivering articles to said elevator, said means comprising a plurality of oppositely facing parallel members directed toward each other and arranged to engage the bottom of the article at opposite edges, means to cause said members to move laterally away from each other to deposit an article on the elevator, means to cause said members to approach each other after the article is deposited, and means to lower said elevator.

17. In a conveyor mechanism, an elevator, means to lower said elevator step by step until a predetermined number of steps have been taken, a brake for controlling said lowering action, a stop for holding said elevator after each step, means for raising said elevator, and automatic means operated by the elevator for holding said stop disengaged and said brake off while the elevator is being raised.

18. In a conveying mechanism, an elevator, means for delivering articles to said elevator, said means comprising a pair of opposed frames, a plurality of rollers mounted in said frames, said rollers in opposite frames being parallel and directed toward each other, means to move said frames laterally whereby an article resting on the rollers will slide longitudinally thereon and be deposited on the elevator, and means to cause said frames to return to normal position after depositing the article.

19. In a conveyor mechanism, a horizontal conveyor, an elevator, means to lower said elevator step by step until a predetermined number of steps have been taken, a stop for holding said elevator after each step, means to automatically release the stop so that the elevator may be lowered, means for discharging a stack of articles from the elevator, means for raising said elevator and automatic means for holding said stop disengaged while the elevator is being raised.

20. A stacking mechanism for delivering articles to a stacking elevator, comprising a pair of laterally movable members, means to deliver articles to said members when they are together, means to prevent delivery of articles to said members when they are separated, means controlling the movement of said members, said last mentioned means including a shaft, means for rocking said shaft, operating means for controlling the rocking means, said operating means being controlled by the presentation of an article to the stacking mechanism.

21. In a conveying mechanism, means to convey a plurality of boxes, an elevator, means whereby the boxes may be deposited on the elevator, means whereby after each box is deposited upon the elevator, the latter descends step by step a distance substantially equal to the height of a box and means whereby the distance the elevator descends may be adjusted, the bottom of each box remaining horizontal throughout its movement.

22. A mechanism for delivering articles from a horizontal conveyor to the point beneath the conveyor, said means comprising a pair of laterally movable members, means to deliver said articles to said members when they are together, means to prevent delivery of articles to said members when they are separated, means controlling the movement of said members, said means including an operating shaft, power operated mechanism for operating said shaft and means for controlling said power operating mechanism, said last mentioned means including a member adapted to be operated by an article being conveyed.

23. A mechanism for delivering articles from a horizontal conveyor to the point beneath the conveyor, said means comprising a pair of laterally movable members, means to deliver said articles to said members while they are together, means to prevent delivery of articles to said members when they are separated, means controlling the movement of said members, said means comprising a shaft, power operated mechanism for operating said shaft, and means adapted to be engaged by an article being transported for controlling said power operated mechanism.

24. In an article stacking mechanism, a reciprocating elevator, a pair of supports mounted above the elevator and movable toward and from each other, means to deliver articles to the supports when they are together and means to prevent delivery of articles to said support when they are separated, means to separate said supports to deposit an article held thereon upon the elevator step by step, means to lower the elevator after each article is deposited thereon, means to repeat the described operation until a predetermined number of articles are deposited one upon the other, means to remove the stack of articles from the elevator, and means to raise the elevator.

25. A mechanism for delivering articles from a horizontal conveyor to the point beneath the conveyor, said means comprising a pair of laterally movable members, means to deliver said articles to said members while the latter are together, means to prevent delivery of articles to said members when they are separated, means controlling the movement of said members, said means comprising a system of levers pivotally and slidably connected to the opposite ends of said members, a shaft to which said levers are secured, a pair of links for rocking said shafts, power operated mechanism for operating said links, means for controlling said power operating mechanism, said means including a clutch, an operating member for the clutch, said operating member including a roller adapted to be engaged and moved by an article being transported.

26. In a box stacking machine, a guide way, an elevator movable thereon, said elevator including a box receiving platform, a cable drum for raising said elevator, means for lowering said elevator, step by step, said means including a mechanism for imparting rotation to the cable drum, and means for changing the diameter of the cable drum whereby the distance traveled by the elevator at each step may be varied.

27. In a box stacking machine, an elevator including a box receiving platform, a guide way, a cable drum, a cable connecting said drum to said elevator, said drum comprising a pair of end members having opposed conical sections thereon, a plurality of strips having beveled edges corresponding to the incline of the conical surfaces of the ends, and means for bringing the end members nearer each other whereby the strips are forced apart and the diameter of the drum is altered.

28. In a conveyor, an article stacking mechanism including an elevator, means arranged above the elevator to support articles to be stacked, means to lower said elevator step by step, a brake and a stop member coacting to produce said step by step action, and a single means operated by the article being conveyed for causing the article to be deposited on the elevator for removing the stop and for causing the elevator to be lowered.

29. In an elevator, a cable drum, a cable connecting the elevator and drum, means for lowering the elevator step by step, a delivery conveyor coacting with the elevator and adapted to remove a stack of articles formed on the elevator, means whereby the stack of articles is delivered when the elevator passes below the conveyor, means whereby the delivery of the stack of articles from the elevator and their removal causes the elevator to ascend, said means including a trip lever adapted to be engaged by the lowermost of the stack of boxes, a clutch controlling the cable drum, said trip lever being adapted to throw in said clutch for winding up the cable drum.

30. In a box stacking machine, an elevator, means to lower said elevator step by step, said means comprising a cable, a cable drum on which said cable is wound, means to operate said drum, and control means for said operating means, said control means being actuated by the positioning of a box relative to said elevator.

31. In an elevator, a supporting frame, a platform movable thereon, a pair of gates arranged above said platform, means to move said gates apart to deposit a box held on said gates upon said platform, means to feed a box to said gates, other means operable when a box is positioned upon said gates to stop said feeding means and to separate said gates, said other means comprising levers engaging the ends of the gates, a link pivoted to each lever, there being a pair of said links adjacent one end of the gates, and means to move said links.

32. In a conveying mechanism, an elevator, means whereby articles may be fed to the elevator, means whereby the elevator is lowered step by step to form a stack of articles, said feeding means comprising a horizontal conveyor and a mechanism for discharging the articles upon the elevator, a pair of stops controlling the movement of articles to the discharging mechanism, one of said stops being arranged to function while the elevator is being lowered and being out of service position when the elevator is stationary or ascending, the second stop being adapted to function as soon as the downward journey of the elevator is complete and being maintained in operative position until the elevator has ascended to loading position.

33. In a conveying mechanism, an elevator, means for stacking articles one upon the other upon said elevator, a horizontal conveyor for conveying the stack of articles from the elevator, said articles having a length greater than the length of the elevator platform whereby the ends of the articles project beyond the ends of the elevator, said conveyor comprising a pair of horizontal chains spaced apart a distance greater than the length of the elevator whereby the elevator can move between the chains and deliver the articles upon said chains, a second conveyor for conveying the articles away from the first conveyor, said second conveyor comprises a pair of spaced chains.

34. In a conveying mechanism, an elevator including a supporting member, means for lowering said supporting member, a horizontal conveyor for conveying a stack of articles on the elevator supporting member away from said platform, said articles having a length greater than the length of the supporting member, whereby the ends of the articles project beyond the ends of the supporting member, said conveyor comprising a pair of horizontal chains spaced apart so that the supporting member can move beneath the chains and deliver the articles upon said chains.

In testimony whereof, I hereunto affix my signature.

FRANK B. ROBERTS.